(12) United States Patent
Lavie

(10) Patent No.: US 6,557,996 B2
(45) Date of Patent: May 6, 2003

(54) APPARATUS FOR ATTACHING SUPPLEMENTARY LENSES TO EYEGLASSES

(76) Inventor: Philippe Lavie, 61 rue des Ebisoires, 78370 Plaisir (FR)

( * ) Notice: Subject to any disclaimer, the term of this patent is extended or adjusted under 35 U.S.C. 154(b) by 0 days.

(21) Appl. No.: 10/183,373

(22) Filed: Jun. 28, 2002

(65) Prior Publication Data

US 2002/0159022 A1 Oct. 31, 2002

Related U.S. Application Data

(63) Continuation of application No. PCT/FR00/03691, filed on Dec. 12, 2000.

(30) Foreign Application Priority Data

Jan. 7, 2000 (FR) .............................................. 00 00142

(51) Int. Cl.[7] .............................................. G02C 9/00
(52) U.S. Cl. .............................. 351/47; 351/48; 351/57
(58) Field of Search ............................ 351/47, 48, 57, 351/58, 44, 41, 124, 133, 126, 90

(56) References Cited

U.S. PATENT DOCUMENTS

| 5,654,785 A | * | 8/1997 | Shih et al. ..................... 351/47 |
| 5,724,118 A | * | 3/1998 | Krebs .......................... 351/57 |
| 5,920,370 A | | 7/1999 | Glanzbergh |

FOREIGN PATENT DOCUMENTS

| DE | 29610698 U | 8/1996 |
| WO | WO 9915931 A | 4/1999 |
| WO | WO 9947965 A | 9/1999 |

* cited by examiner

Primary Examiner—Hung Xuan Dang
(74) Attorney, Agent, or Firm—Lawrence E. Laubscher, Sr.

(57) ABSTRACT

The invention concerns a device for fixing additional lenses on spectacles, comprising a flexible bridge (10) consisting of a single piece with lateral branches (12) comprising means for fixing a flexible wire for mounting additional lenses on said branches (12). The invention is in particular useful for fixing additional filtering or correcting lenses on spectacles.

10 Claims, 3 Drawing Sheets

APPARATUS FOR ATTACHING SUPPLEMENTARY LENSES TO EYEGLASSES

REFERENCE TO RELATED APPLICATION

This application is a continuation of the PCT International Application No. PCT/FR00/03691 filed on Dec. 12, 2000, which is based on the French Application No. 00-00142 filed on Jan. 7, 2000.

BACKGROUND OF THE INVENTION

1. Field of the Invention

The present invention relates to a device for fixing supplementary lenses to eyeglasses.

2. Description of the Prior Art

Such devices are mostly used to mount filter lenses (which provide protection against solar radiation) to eyeglasses with prescription lenses and are generally of a standard type that does not correspond to the frame of the eyeglasses. They are also fitted with lenses that do not have the same shape as the prescription lenses of the eyeglasses, which makes the combination of the device with filter lenses and the eyeglasses with prescription lenses rather heavy, bulky and unattractive. Also, these prior art devices include means for attaching them to the eyeglasses whose fit to the frame of the eyeglasses is somewhat hit and miss.

There has already been proposed, in U.S. Pat. No. 5,920,370, a device of the above type that is formed of a flexible material bridge and two flexible material supports fixed to the bridge by screws. Nylon filaments for mounting lenses on the supports are fixed or attached to the supports. Hooks for fixing the device to the eyeglasses are mounted on the supports by means of screws. This device provides a better match to the shape of the frame of the eyeglasses, thanks to the flexibility of the bridge and the supports, but because the hooks and the supports are fixed by means of screws, it is relatively complex, time-consuming and costly to fabricate and assemble.

OBJECT OF THE INVENTION

One particular object of the invention is to simplify the fabrication and assembly of a device of the above kind and thereby reduce its cost.

Another object of the invention is to render this type of device adaptable to any type of eyeglasses.

SUMMARY OF THE INVENTION

It provides a device for fixing supplementary lenses to eyeglasses, including a bridge connected to branches including means for fixing a flexible filament for mounting supplementary lenses on said branches, and attachment means for attaching the device to the eyeglasses, characterized in that the bridge and the branches are made in one piece from a flexible material.

This feature of the invention greatly simplifies the structure of the device for fixing supplementary lenses to eyeglasses, simplifies its fabrication and assembly, increases it reliability, and greatly reduces its unit cost.

Moreover, the flexibility of the bridge and the branches enables a good match to be obtained to the shape of the lenses and to the shape of the frame of the eyeglasses.

Advantageously, the bridge and the flexible branches are molded in one piece from a plastics material or diecast in one piece from a metal.

According to another characteristic of the invention, the attachment means are formed in one piece with said flexible branches Accordingly, a single molding operation produces a device comprising a bridge, lens support branches, and attachment means, such as flexible hooks, for fixing the device to eyeglasses.

According to another characteristic of the invention, at least some of the attachment means are mounted on the flexible filament for fixing the supplementary lens to said flexible branch.

Advantageously, the position of the elastic attachment means can be adjusted by sliding it along the flexible filament.

This means that the device according to the invention can be matched to any shape of eyeglasses frame.

Generally speaking, the device according to the invention is extremely simple because it can be made in one piece, is light in weight, unobtrusive and compact, and can be matched to all types of eyeglasses frames and lenses.

BRIEF DESCRIPTION OF THE DRAWINGS

The invention will be better understood and other features, details and advantages of the invention will become more clearly apparent on reading the following description, which is given by way of example and with reference to the accompanying drawings, in which.

DETAILED DESCRIPTION OF THE PREFERRED EMBODIMENTS

Figure 1:
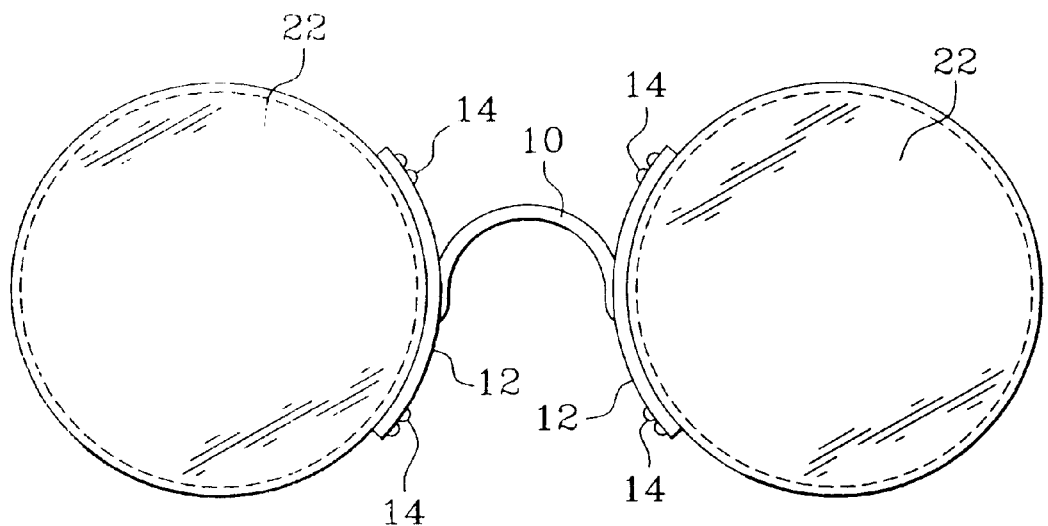
FIGS. 1 and 2 are respectively front and to views of a first embodiment of a device according to the invention.
Figure 2:
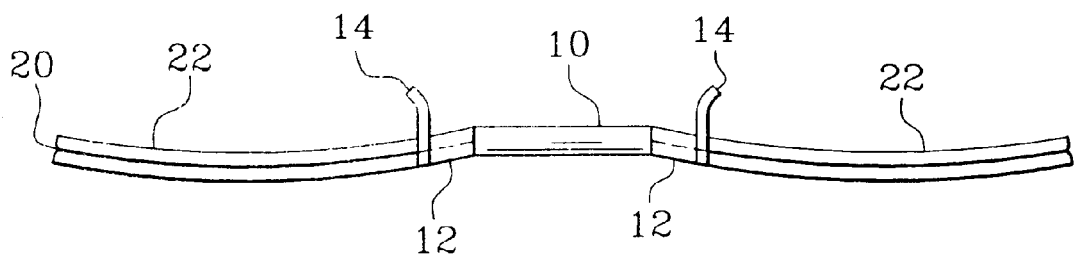

Refer first to FIGS. 1 to 5, which show a first embodiment of the invention.

In these figures, the device carrying the supplementary lenses, which is referred to by the person skilled in the art as a "face", comprises a one-piece molded combination of a bridge 10, two lateral branches 12, and means 14 for attaching it to eyeglasses; the bridge 10 is connected at its ends to median or intermediate portions of the lateral members 12 and the attachment means are outwardly oriented curved lugs.

The lateral branches 12 form means for supporting supplementary lenses, such as filter lenses providing protection against solar radiation, and are initially straight or curved in the shape of a circular arc. At their exterior end with respect to the bridge 10, the branches comprises a series of projections 16 adapted to nest in the peripheral groove of a lens.

At their ends, the branches 12 comprise one or two holes 18 for a nylon filament or the like which is engaged in the peripheral groove 20 of a lens 22 to fix the lens to the member 12.

The combination of the bridge 10, the lateral branches 12 and the hooks 14 is made of a molded, for example injection-molded, plastics material such as nylon or the like, or possibly of a diecast metal. The lenses 22 intended to be mounted on the face are cut to the same shape and the same dimensions as the lenses of the eyeglasses on which the face is to be mounted. To mount the lenses 22, one end of a nylon filament is inserted into one of the holes 18 in a lateral branch 12 and the end of the filament is heated to form a ball for retaining the filament by preventing it escaping through the hole 18, the lens is placed on the lateral branch 12 with the projections 16 engaged in the peripheral groove of the lens, the necessary length of the nylon filament is determined by bending the branch 12 to match the contour of the lens, the other end of the filament is inserted into a hole 18 at the other end of the branch 12, after removing the lens from the branch 12, and the other end of the nylon filament is heated to form a ball for retaining the filament in the corresponding hole 18. The lens is then mounted inside the support formed by the branch 12 and the nylon filament whose ends are fixed into the holes 18 at the ends of the branch 12, the elasticity of the nylon filament and the branch 12 ensuring a tight fit of the lens in its support.

The same procedure is followed for the second lens and the second lateral branch 12.

The face is then ready to be mounted on eyeglasses, simply by engaging the hooks 14 over the lenses or the frame of the eyeglasses.

In this embodiment of the invention, the branches 12 are applied to the lateral edges of the lenses 22 at the end adjoining the bridge 10.

Because the shape and dimensions of the lenses 22 are identical to those of the lenses of the eyeglasses, the face when mounted on the eyeglasses is unobtrusive and does not impede the vision of the wearer of the eyeglasses.

Figures 3, 4:
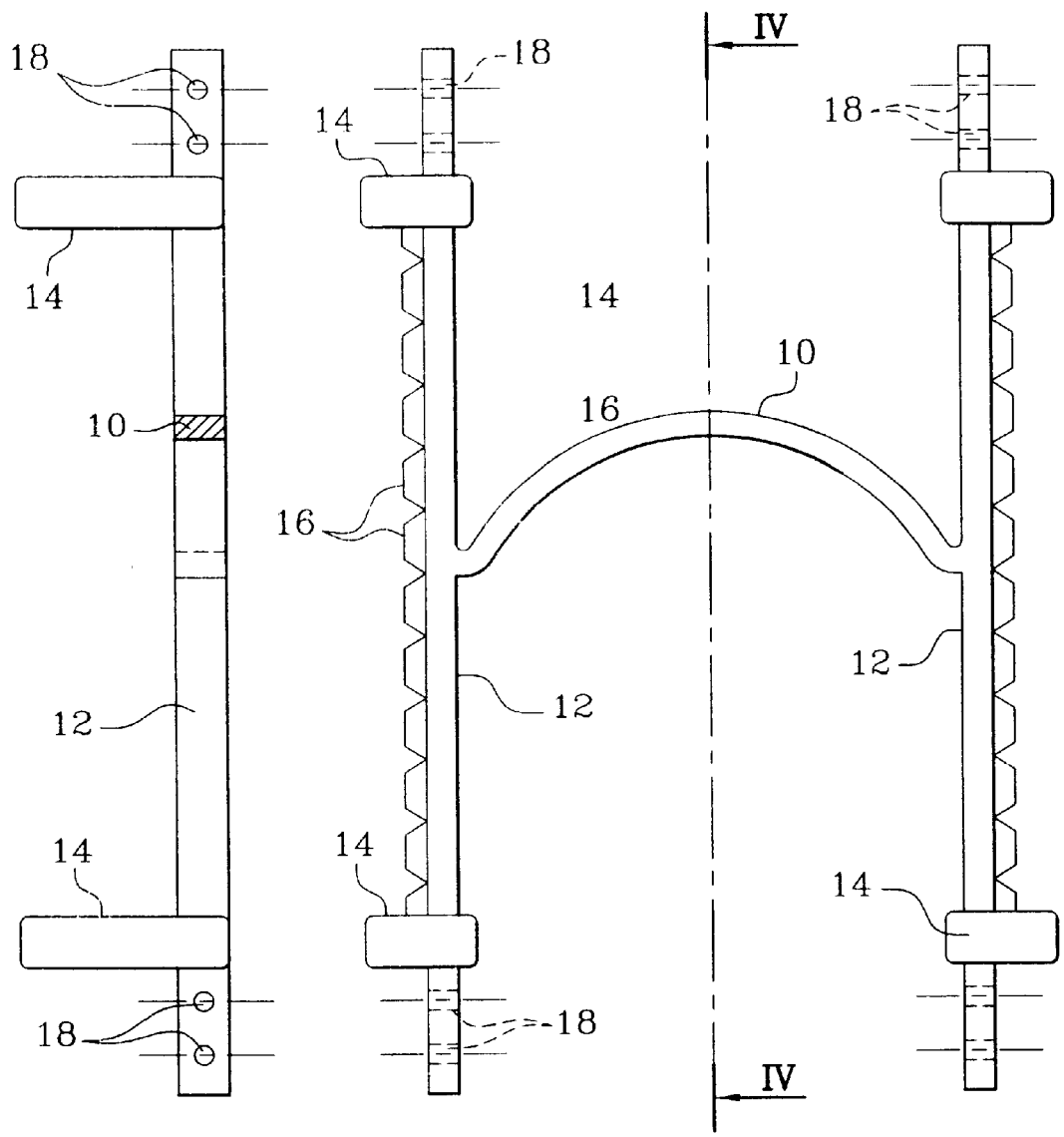
FIG. 3 is a front view to a larger scale of a portion of the device.
FIG. 4 is a view in section taken along the line IV—IV in FIG. 3.
Figure 5:
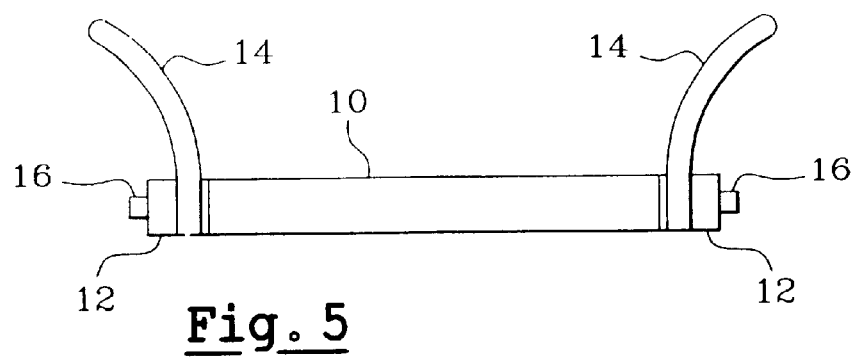
FIG. 5 is a bottom view of the device from FIG. 3.

The ends of the bridge 10 can be connected to the lateral branches 12 either perpendicularly to the branches, as shown in FIG. 3, or substantially tangentially thereto.

The device from FIGS. 1 to 5 can be adapted to a large number of different eyeglasses frames, thanks to the flexibility of the bridge 10 and the lateral branches 12.

Figure 6:
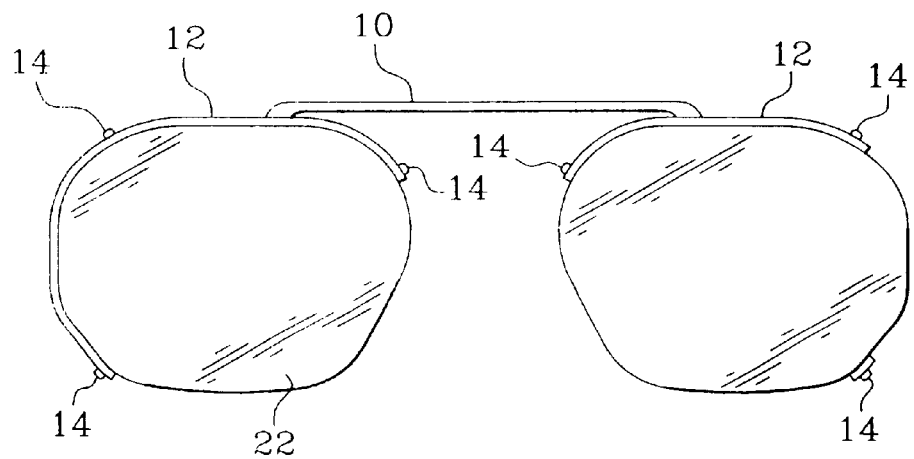
FIG. 6 is a diagrammatic front view of a different embodiment of the device according to the invention.
Figure 7:
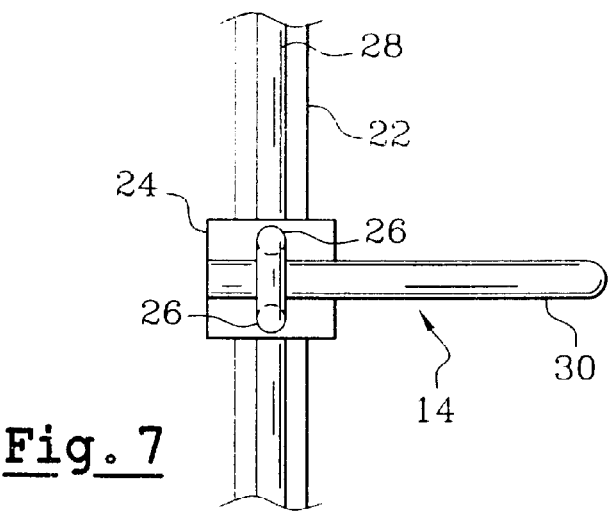
FIG. 7 is a partial view to a larger scale of attachment means of the device from FIG. 6.
Figure 8:
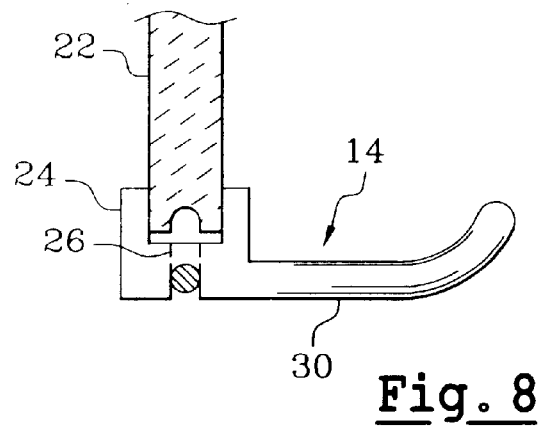
FIG. 8 is a top view of the attachment means from FIG. 7.

The embodiment of the invention shown in FIGS. 6 to 8 has the advantage of being universal, i.e. of being adaptable to all types of frames, including thick plastics material frames. In this embodiment of the invention, the bridge 10 is substantially straight and is level with or slightly above the to edge of the lenses 22, and is connected to lateral branches 12 that embrace substantially half the periphery of the lenses 22, on their outer side (the side opposite the bridge 10), as shown in the left-hand part of FIG. 6, or embrace the lenses along their top edge only, as shown in the right-hand part of FIG. 6.

In the former case, the lateral branches 12 include molded-in hooks 14 for fixing the device to an eyeglasses frame, for example two hooks 14 at the ends of a lateral branch 12 and a third hook substantially in the middle of that branch.

As in the previous embodiment of the invention, the ends of each lateral branch 12 are linked by a nylon filament that surrounds the remainder of the periphery of the lens 22 and locates in a peripheral groove of the lens.

If the lateral branches 12 extend only along the top edge of the lenses 22, as shown in the right-hand part of FIG. 6, the branches each carry two hooks 14 at their ends, and a third hook 14 is mounted on the nylon filament that grips the lens 22 between the ends of the lateral branch 12.

The device according to the invention can be used to fit solar protection filter lenses to prescription eyeglasses, but can also be used to fit supplementary prescription lenses to eyeglasses, for example to improve near vision or nocturnal vision.

I claim:

1. A device for fixing supplementary lenses to eyeglasses, including a bridge (10) connected to branches (12) including means for fixing a flexible filament for mounting supplementary lenses (22) on said branches, and attachment means (14) for attaching the device to the eyeglasses, characterized in that the bridge (10) and the branches (12) are made in one piece from a flexible material and the attachment means (14) of the device are adapted to cooperate with the lenses of the eyeglasses.

2. A device according to claim 1, characterized in that the bridge (10) and the flexible branches (12) are molded in one piece from a plastics material or diecast in one piece from a metal.

3. A device according to claim 1, characterized in that the inside face of each branch (12) includes a series of projections (16) adapted to locate in a peripheral groove (20) of the supplementary lens (22).

4. A device according to claim 1, characterized in that the attachment means (14) are elastic and formed in one piece with the flexible branches (12).

5. A device according to claim 1, characterized in that at least one attachment means (14) which is elastic is mounted on the flexible filament (28) for fixing the supplementary lens to the flexible branch (12).

6. A device according to claim 5, characterized in that the position of said elastic attachment means (14) can be adjusted by sliding it along the flexible filament (28).

7. A device according to claim 1, characterized in that the bridge (10) is connected to median or intermediate portions of said flexible branches (12).

8. A device according to claim 1, characterized in that the bridge (10) is connected to said branches (6) at the ends thereof or in the vicinity of the ends thereof.

9. A device according to claim 1, characterized in that said branches (12) are applied to lateral edges of the supplementary lenses (22).

10. A device according to claim 1, characterized in that said branches (12) are applied at least to upper edges of the supplementary lenses (22).

* * * * *